United States Patent
Hishinuma et al.

(10) Patent No.: US 11,932,768 B2
(45) Date of Patent: Mar. 19, 2024

(54) ACTIVE ENERGY RAY-CURABLE INK COMPOSITION, METHOD FOR PRODUCING SAME, AND METHOD FOR PRODUCING PRINTED MATTER IN WHICH SAME IS USED

(71) Applicant: SAKATA INX CORPORATION, Osaka (JP)

(72) Inventors: Keishiro Hishinuma, Osaka (JP); Naoki Omi, Osaka (JP)

(73) Assignee: SAKATA INX CORPORATION, Osaka (JP)

(*) Notice: Subject to any disclaimer, the term of this patent is extended or adjusted under 35 U.S.C. 154(b) by 150 days.

(21) Appl. No.: 17/593,541

(22) PCT Filed: Feb. 26, 2020

(86) PCT No.: PCT/JP2020/007614
§ 371 (c)(1),
(2) Date: Sep. 20, 2021

(87) PCT Pub. No.: WO2020/195469
PCT Pub. Date: Oct. 1, 2020

(65) Prior Publication Data
US 2022/0169871 A1     Jun. 2, 2022

(30) Foreign Application Priority Data

Mar. 22, 2019  (JP) .................................. 2019-054148

(51) Int. Cl.
| | |
|---|---|
| *C09D 11/10* | (2014.01) |
| *B41M 5/00* | (2006.01) |
| *C09D 11/06* | (2006.01) |
| *C09D 11/08* | (2006.01) |
| *C09D 11/101* | (2014.01) |

(52) U.S. Cl.
CPC ......... *C09D 11/101* (2013.01); *B41M 5/0023* (2013.01); *C09D 11/06* (2013.01); *C09D 11/08* (2013.01)

(58) Field of Classification Search
CPC ......... C09D 11/37; C09D 11/06; C09D 11/08; C09D 11/10; C09D 11/101; B41M 5/0023
See application file for complete search history.

(56) References Cited

U.S. PATENT DOCUMENTS

| | | | | |
|---|---|---|---|---|
| 4,409,077 A | * | 10/1983 | Sakiyama ............ | C08G 12/427 |
| | | | | 525/518 |
| 9,453,136 B2 | * | 9/2016 | Kaneko .................... | C08K 5/27 |
| 10,815,386 B2 | * | 10/2020 | Hishinuma .......... | C09D 11/107 |
| 11,365,324 B2 | * | 6/2022 | Hishinuma ............ | C09D 11/06 |
| 11,597,847 B2 | * | 3/2023 | Ishizuka .............. | C09D 11/105 |
| 2003/0054103 A1 | * | 3/2003 | Sato ..................... | C09D 11/101 |
| | | | | 427/256 |
| 2009/0247672 A1 | | 10/2009 | Hanawa | |
| 2011/0015339 A1 | | 1/2011 | Kinoshita et al. | |

FOREIGN PATENT DOCUMENTS

| | | | | |
|---|---|---|---|---|
| JP | H07138516 A | | 5/1995 | |
| JP | 2004161812 A | | 6/2004 | |
| JP | 2004359767 A | | 12/2004 | |
| JP | 2007045103 A | * | 2/2007 | |
| JP | 2014015572 A | | 1/2014 | |
| JP | 5477995 B | | 4/2014 | |
| JP | 2018065912 A | | 4/2018 | |
| JP | 2018115223 A | | 7/2018 | |
| WO | WO-2009119472 A1 | * | 10/2009 | ........... C09C 1/3072 |
| WO | 2018131666 A1 | | 7/2018 | |
| WO | WO-2018131666 A1 | * | 7/2018 | ................ B41F 3/34 |
| WO | WO-2020138132 A1 | * | 7/2020 | ........... C09D 11/101 |

OTHER PUBLICATIONS

European Patent Office, Extended European Search Report Issued in Application No. 20780043.4, dated Nov. 15, 2022, Germany, 7 pages.

* cited by examiner

*Primary Examiner* — Sanza L. McClendon
(74) *Attorney, Agent, or Firm* — Alleman Hall & Tuttle LLP

(57) ABSTRACT

To provide an active energy ray-curable ink composition that increase the content of raw materials derived from biomass and contains a material having superior pigment dispersibility, such as a rosin-modified phenol resin. An active energy ray-curable ink composition containing a compound having one or more ethylenically unsaturated bonds, a specific resin, and a specific liquid ingredient is provided, wherein the specific resin is at least one selected from the group consisting of rosin-modified phenol resins, rosin-modified maleic acid resins, rosin-modified alkyd resins, gilsonite resins, and asphalt resins, and the specific liquid ingredient is fat and oil that is derived from animals or vegetables or a modified product thereof having no ethylenically unsaturated bonds and a solubility parameter value (hereinafter referred to as sp value) of 9.0 $(cal/cm^3)^{1/2}$ to less than 11.0 $(cal/cm^3)^{1/2}$ as measured by turbidimetric titration.

5 Claims, No Drawings

ACTIVE ENERGY RAY-CURABLE INK COMPOSITION, METHOD FOR PRODUCING SAME, AND METHOD FOR PRODUCING PRINTED MATTER IN WHICH SAME IS USED

TECHNICAL FIELD

The present invention relates to an active energy ray-curable ink composition, a method for producing the ink composition, and a method for manufacturing printed matter with the ink composition.

BACKGROUND ART

In the case of printing with ink compositions, various printing processes are appropriately selected depending on the materials and shapes of print targets, and ink compositions having appropriate properties are also selected according to the printing processes. For example, in an offset printing process with a lithographic printing plate on flat paper sheets, ink compositions having high viscosity containing vegetable oil or mineral oil are used. In a flexographic printing process with a rubbery relief printing plate on cardboard sheets, aqueous ink compositions having remarkably high fluidity are used. In addition, it is well known that various printing processes, such as gravure printing, screen printing, letterpress printing, and inkjet printing, are appropriately selected and put in practice.

In printing processes, one essential step for forming images, in addition to fixing of ink compositions to print targets, is drying of the ink compositions after printing. Insufficient drying causes the following problem: Since the ink composition immediately after printing is not sufficiently fixed on the surface of the target, the ink composition adheres to fingers with which the targets are touched, and printed images will be blurred or contaminated when the targets are rubbed. Accordingly, the ink compositions should be sufficiently fixed or dried on the surfaces of the targets before the printed targets are transferred to a subsequent step. A variety of steps of fixing (i.e., drying) the ink compositions after printing are in practical use depending on the type of ink composition used. Examples of such steps include permeation of the solvents into the printed targets, evaporation of the solvents from the printed targets, and oxidative polymerization of ingredients contained in the ink compositions. All the drying steps involve a considerable amount of time. In contrast with such phenomena, the time required for the drying cannot be ignored because the printing rate has been improved due to technological advances in recent years.

In such circumstances, printing processes with active energy ray-curable ink compositions have recently been developed. In such an active energy ray-curable ink composition, the ingredients contained in the ink composition can be polymerized by irradiation with ultraviolet rays or electron beams to achieve the drying. Since the time required for the drying is significantly short, the printing with such an ink composition can meet the demand for promptly transferring of the printed matter to a subsequent step. Examples of the ink composition suitable for such a drying step includes an ink composition disclosed in PTL 1 for an offset printing process, and an ink composition disclosed in PTL 2 for a resin relief printing process.

In recent years, activities for a reduction in environmental load have been developed in various industrial and business categories, and their common ultimate goal is to achieve global environmental conservation. Also in the printing ink industry, the activities to promote the reduction in environmental load have been practiced from various viewpoints, and the print products that comply with the gist of such activities are given various kinds of certification marks. Examples of such certification marks include a Negative List (NL) regulation mark, a vegetable oil ink mark, a green printing (GP) mark, and a clione mark. In this situation, the Japan Printing Ink Makers Association has recently established a novel system called an ink green mark (hereinafter referred to as IG mark). The IG mark is based on the system where the level of environmental friendliness of the ink composition is categorized into three ranks depending on the rate of biomass-derived ingredients in all main ingredients that make up the ink composition as criteria of the mark. In other words, this system is characterized by promoting the replacement of fossil resource-derived raw materials with biomass-derived raw materials for the purpose of reduction in environmental load.

Also in the active energy ray-curable ink compositions described above, the products that can be dried with lower irradiation of ultraviolet rays and the energy-saving products that can be dried with light from light emitting diodes (LEDs) having lower power consumption are commercially available, and the movement leading to a reduction in environmental load is expanding similar to other ink compositions. However, the production of the active energy ray-curable ink compositions requires large amounts of monomers and oligomers; hence such ink compositions cannot contain high rates of biomass-derived ingredients. As a result, the criteria of certification of IG mark described above for the active energy ray-curable ink composition lacks in the rates of biomass-derived ingredients, and thereby such criteria use characteristics, such as recycling suitability and energy saving, on environmental friendliness in place of the rates of biomass-derived ingredients.

CITATION LIST

Patent Literatures

PTL1: JP 5477995B
PTL2: JP 2004-161812A

BRIEF DESCRIPTION OF THE INVENTION

Problems to be Solved

Under the background described above, enrichments in biomass-derived ingredients are valuable to society and of great significance also in the active energy ray-curable ink compositions. Unfortunately, monomers and oligomers used in the active energy ray-curable ink compositions do not necessarily have high compatibility with biomass-derived materials used in general ink compositions; hence, such biomass-derived materials cannot be readily applied to active energy ray-curable ink compositions in the current situation.

In addition, active energy ray-curable ink compositions have a shorter history since emerging than the ink compositions that can be dried by other drying processes, and materials constituting such ink compositions are still in the development stage. In particular, from the viewpoint of compatibility with monomers and oligomers, resins having high pigment dispersibility, such as rosin-modified phenolic resins, which have been used in ink compositions for offset printing for many years, have not readily been employed in the active energy ray-curable resins; hence, the pigments are dispersed in the ingredients having low molecular weight, such as monomers and oligomers, which do not necessarily have high pigment dispersibility, in the current situation.

An object of the present invention, which has been made in view of such circumstances, is to provide an active energy ray-curable ink composition that can contain increased amounts of raw materials derived from biomass and contain materials having high pigment dispersibility, such as rosin-modified phenolic resins.

Means to Solve Problems

As a result of diligent studies to solve the above problems, the present inventors have found that the addition of fats and oils or modified products thereof that are derived from animals or vegetables having specific sp values (i.e., a solubility parameter measured by turbidimetric titration) can improve compatibility of resins having high pigment dispersibility, such as rosin-modified phenolic resins, used in conventional ink compositions with active energy ray-curable ink compositions. It should be understood that the fats and oils derived from animals and vegetables or modified products thereof are derived from biomass, and the rosin contained in the resin including the rosin-modified phenol resin is also derived from biomass. Accordingly, the inventive ink composition containing these ingredients is a product containing high amounts of raw materials derived from biomass. The present invention has been completed based on the above findings, and provides the following ink composition.

The present invention provides an active energy ray-curable ink composition containing a compound having one or more ethylenically unsaturated bonds, a specific resin and a specific liquid ingredient, wherein the specific resin is at least one selected from the group consisting of rosin-modified phenol resins, rosin-modified maleic acid resins, rosin-modified alkyd resins, gilsonite resins, and asphalt resins, and the specific liquid ingredient is fat and oil that is derived from animals or vegetables or a modified product thereof having no ethylenically unsaturated bonds and a solubility parameter (sp) value of 9.0 $(cal/cm^3)^{1/2}$ to less than 11.0 $(cal/cm^3)^{1/2}$ as measured by turbidimetric titration.

The specific liquid ingredient preferably comprises at least one selected from the group consisting of fats and oils derived from animals or vegetables and modified products thereof having an sp value of 9.0 $(cal/cm^3)^{1/2}$ to 10.0 $(cal/cm^3)^{1/2}$, and cashew nut shell oil and modified products thereof.

The sp value of the specific resin is preferably 8.0 $(cal/cm^3)^{1/2}$ to 9.0 $(cal/cm^3)^{1/2}$.

The content of the specific liquid ingredient is preferably 10 mass % to 50 mass % in the ink composition.

The specific liquid ingredient is preferably at least one selected from the group consisting of castor oil, coconut oil, epoxidized vegetable oil, cashew nut shell oil, and modified products of cashew nut shell oil.

The present invention also provides a process for producing an active energy ray-curable ink composition containing a compound having one or more ethylenically unsaturated bonds, a specific resin, a specific liquid ingredient and a photopolymerization initiator, the process comprising a step of dissolving the specific resin in the heated specific liquid ingredient to prepare a varnish, wherein the specific resin is at least one selected from the group consisting of rosin-modified phenol resins, rosin-modified maleic acid resins, rosin-modified alkyd resins, gilsonite resins, and asphalt resins, and the specific liquid ingredient is fat and oil that is derived from animals or vegetables or a modified product thereof having no ethylenically unsaturated bonds and a solubility parameter (sp) value of 9.0 $(cal/cm^3)^{1/2}$ to less than 11.0 $(cal/cm^3)^{1/2}$ as measured by turbidimetric titration.

The present invention also provides a method for manufacturing printed matter, which comprises a step of printing with the active energy ray-curable ink composition.

Advantageous Effects of the Invention

The present invention provides an active energy ray-curable ink composition that can contain increased amounts of raw materials derived from biomass and contain materials having superior pigment dispersibility, such as a rosin-modified phenol resin.

EMBODIMENTS OF THE INVENTION

Now described are one embodiment of an active energy ray-curable ink composition of the present invention, one embodiment of a method for producing the active energy ray-curable ink composition of the present invention, and one embodiment of a method for manufacturing printed matter of the present invention. The present invention should not be limited to the following embodiments, and can be appropriately modified within the scope of the present invention.

<Active Energy Ray-Curable Ink Composition>

The active energy ray-curable ink composition of the present invention (hereinafter, also simply referred to as "ink composition") is preferably used in, for example, an offset lithographic printing process and a resin relief printing process, and can be cured by irradiation with active energy rays, such as ultraviolet rays and electron beams. As will be described later, the inventive ink composition contains a compound having one or more ethylenically unsaturated bonds (e.g., monomers and oligomers), and can be cured through polymerization of the compound having one or more ethylenically unsaturated bonds induced by radicals generated upon irradiation with active energy rays. Accordingly, the sticky ink composition on the surface of printed matter immediately after printing can be cured by irradiation with active energy rays to instantly form dry or tack-free films.

The inventive ink composition is used in offset printing on any print target that is used in ordinary offset printing. As described above, the inventive ink composition instantly turns to a tack-free state by irradiation with active energy rays after printing, and thereby this curing system can be used in printing to promptly transfer the print products to a subsequent step. The inventive ink composition can also be preferably used in resin relief printing. In the resin relief printing, an ink composition adheres to protruding portions of a resin relief printing plate and the adhered ink composition is transferred to a print target. Examples of the print target include simple printed matter, such as stickers and labels, and printed matter having curved surfaces. More specifically, examples of stickers and labels include stickers and thermal stickers made of synthetic paper and ordinary paper, and examples of the printed matter having curved surfaces include, but should not be limited to, containers such as beverage cups, ice cream cups, and noodle cups made of synthetic resin or ordinary paper. Examples of the synthetic resin constituting these containers include, but should not be limited to, amorphous polyethylene terephthalate (A-PET), polystyrene, expanded polystyrene, and polypropylene. Since the printing plate used in the resin relief printing is made of resin and is deformable along the shape of the print target, printing can be performed even on the curved surfaces described above.

Examples of the active energy rays used in the curing of the inventive ink composition include electron beams and ultraviolet rays. Particularly preferred active energy rays are ultraviolet rays from the viewpoint of low costs and ease of machine handling. In the use of ultraviolet rays, the inventive ink composition needs to contain a photopolymerization initiator, which generates radicals upon photoirradiation. The wavelength of the ultraviolet rays may be appropriately determined depending on the absorption wavelength of the photopolymerization initiator to be employed, and may be 400 nm or less. Examples of the ultraviolet irradiator that generates such ultraviolet rays include metal halide lamps, high-pressure mercury lamps, excimer lamps containing rare gas, and ultraviolet light emitting diodes (LEDs). When electron beams are used in the active energy rays, the chemical bond contained in the ingredient of the ink composition is dissociated to generate radicals due to the irradiation of the electron beams, and these radicals can polymerize ingredients such as monomers in the ink composition, thereby no photopolymerization initiator is required.

The inventive ink composition contains a compound having one or more ethylenically unsaturated bonds, a specific resin, and a specific liquid ingredient. The key point of the present invention is to use the specific resin in combination with the specific liquid ingredient. In conventional active energy ray-curable ink compositions, acrylic acid and/or methacrylic acid (collectively referred to as "(meth)acrylic acid" in the present specification) compounds are used as monomers or oligomers that are main ingredients. Since these ingredients have a higher solubility parameter (sp value), they are incompatible with the resins, such as rosin-modified phenolic resins, that have a low sp value and are used in conventional offset ink compositions. In addition, since heating is required to dissolve these resins, the preparation of a varnish with, for example, monomers through the dissolution of resins causes some problems, such as polymerization of the monomers with such heating. Accordingly, these resins have been hard to be used in active energy ray-curable ink compositions.

The present inventors have surprisingly revealed through intensive study that dissolution of the resins such as rosin-modified phenol resins in oils and fats or modified products thereof derived from animals or vegetables having a predetermined sp value can prepare a varnish that is compatible with monomers or oligomers. The present invention has been made based on the finding, where these oils and fats derived from animals or vegetables or modified products thereof correspond to specific liquid ingredients, and the resins such as rosin-modified phenolic resins used in conventional offset ink compositions correspond to the specific resins. The combined use of these ingredients and the resins in active energy ray-curable ink compositions result in an improvement in pigment dispersibility in the ink compositions and an enhancement in the biomass content in the ink compositions.

The inventive ink composition may contain photopolymerization initiators. The inventive ink composition exhibits curability to electron beams without the photopolymerization initiators, and curability to light, such as ultraviolet rays, with the photopolymerization initiators. The inventive ink composition may contain coloring ingredients (the ingredients that impart a white color or a metallic color to the ink composition is also included in the coloring ingredients in the present invention). In the case that the inventive ink composition contains coloring ingredients, the ink composition can be used in printing applications, such as images and characters, and in the case that the inventive ink composition does not contain coloring ingredients, the ink composition can be used in another applications, such as coating. The inventive ink composition can be used in a variety of print applications, such as package printing, in addition to ordinary printed matter for the purpose of information transmission or appreciation. Individual ingredients will be described in sequence.

[Compound Having One or More Ethylenically Unsaturated Bonds]

The compound having one or more ethylenically unsaturated bonds is an ingredient called a monomer or an oligomer that is polymerized by radicals generated from a photopolymerization initiator described later into a high molecular weight. Various polymers having ethylenically unsaturated bonds, which have a higher molecular weight than oligomers, are also commercially available. Such polymers can also be crosslinked with themselves or with the monomer or oligomer into a higher molecular weight. Such polymers may thus be used as compounds having ethylenically unsaturated bonds together with the monomer or oligomer.

The monomer having one or more ethylenically unsaturated bonds can be polymerized into a high molecular weight, as described above. In many cases, the monomer is a liquid ingredient having a relatively low molecular weight before polymerization and is used as a solvent for dissolving a resin ingredient into a varnish and for adjusting the viscosity of the ink composition. Examples of the monomer include monofunctional monomers having one ethylenically unsaturated bond in the molecule and bi- or higher functional monomers having two or more ethylenically unsaturated bonds in the molecule. The bi- or higher functional monomer can mutually crosslink during the curing of the ink composition, thereby contributing to an increase in curing rate and formation of a rigid film. The monofunctional monomer has no crosslinking ability as described above, thereby contributing to a reduction in curing contraction due to crosslinking. These monomers can be used in combination of several types as needed.

Examples of the monofunctional monomers include alkyl acrylates, such as methyl (meth)acrylate, ethyl (meth)acrylate, butyl (meth)acrylate, hexyl (meth)acrylate, octyl (meth)acrylate, dodecyl (meth)acrylate; and (meth)acrylic acid, ethylene oxide adduct (meth)acrylate, propylene oxide adduct (meth)acrylate, isobornyl (meth)acrylate, cyclohexyl (meth)acrylate, tricyclodecane monomethylol (meth)acrylate, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, hydroxypentyl (meth)acrylate, 2-hydroxy-3-phenoxypropyl (meth)acrylate, 2-hydroxy-3-butoxypropyl (meth)acrylate, 2-hydroxy-3-methoxypropyl (meth)acrylate, di(ethylene glycol) mono(meth)acrylate, tri(ethylene glycol) mono(meth)acrylate, poly(ethylene glycol) mono(meth)acrylate, di(propylene glycol) mono(meth)acrylate, poly(propylene glycol) mono(meth)acrylate, glycerol mono(meth)acrylate, acryloxyethyl phthalate, 2-(meth)acryloyloxyethyl-2-hydroxyethyl phthalate, 2-(meth)acryloyloxypropyl phthalate, β-carboxyethyl (meth)acrylate, (meth)acrylic acid dimer, ω-carboxypolycaprolactone mono(meth)acrylate, dimethylaminoethyl (meth)acrylate, diethylaminoethyl (meth)acrylate, N-vinylpyrrolidone, N-vinylformamide, and (meth)

acryloylmorpholine. These monofunctional monomers may be used alone or in combination.

Examples of the di- or higher functional monomers include difunctional monomers, such as ethylene glycol di(meth)acrylate, di(ethylene glycol) di(meth)acrylate, tri (ethylene glycol) di(meth)acrylate, poly(ethylene glycol) di(meth)acrylate, propylene glycol di(meth)acrylate, di(propylene glycol) di(meth)acrylate, tri(propylene glycol) di(meth)acrylate, poly(propylene glycol) di(meth)acrylate, butylene glycol di(meth)acrylate, pentyl glycol di(meth)acrylate, neopentyl glycol di(meth)acrylate, hydroxypivalyl hydroxypivalate di(meth)acrylate, hydroxypivalyl hydroxypivalate dicaprolactonate di(meth)acrylate, 1,6-hexanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 1,10-decanediol di(meth)acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentanediol di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, dimethyloloctane di(meth)acrylate, 2-ethyl-1,3-hexanediol di(meth)acrylate, 2,5-dimethyl-2,5-hexanediol di(meth)acrylate, 2-methyl-1,8-octanediol di(meth)acrylate, 2-butyl-2-ethyl-1,3-propanediol di(meth)acrylate, 2,4-diethyl-1,5-pentanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 1,10-decanediol di(meth)acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentane di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, dimethyloloctane di(meth)acrylate, 2-ethyl-1,3-hexanediol di(meth)acrylate, 2,5-dimethyl-2,5-hexanediol di(meth)acrylate, 2-butyl-2-ethyl-1,3-propanediol di(meth)acrylate, 2,4-diethyl-1,5-pentanediol di(meth)acrylate, tricyclodecane dimethylol di(meth)acrylate, tricyclodecane dimethylol dicaplolactonate di(meth)acrylate, bisphenol A tetra(ethylene oxide) adduct di(meth)acrylate, bisphenol F tetra(ethylene oxide) adduct di(meth)acrylate, bisphenol S tetra(ethylene oxide) adduct di(meth)acrylate, hydrogenated bisphenol A tetra(ethylene oxide) adduct di(meth)acrylate, hydrogenated bisphenol F tetra(ethylene oxide) adduct di(meth)acrylate, hydrogenated bisphenol A di(meth)acrylate, hydrogenated bisphenol F di(meth)acrylate, bisphenol A tetra(ethylene oxide) adduct dicaplolactonate di(meth)acrylate, and bisphenol F tetra(ethylene oxide) adduct dicaplolactonate di(meth)acrylate; and trifunctional monomers, such as glycerol tri(meth)acrylate, trimethylolpropane tri(meth)acrylate, trimethylolpropane tricaplolactonate tri(meth)acrylate, trimethylolethane tri(meth)acrylate, trimethylolhexane tri(meth)acrylate, trimethyloloctane tri(meth) acrylate, and pentaerythritol tri(meth)acrylate; and tetra- or higher functional monomers, such as trimethylolpropane tetra(meth)acrylate, pentaerythritol tetra(meth)acrylate, pentaerythritol tetracaplolactonate tetra(meth)acrylate, diglycerol tetra(meth)acrylate, ditrimethylolpropane tetra(meth)acrylate, ditrimethylolpropane tetracaplolactonate tetra(meth)acrylate, ditrimethylolethane tetra(meth)acrylate, ditrimethylolbutane tetra(meth)acrylate, ditrimethylolhexane tetra(meth)acrylate, ditrimethyloloctane tetra(meth)acrylate, dipentaerythritol penta(meth)acrylate, dipentaerythritol hexa(meth)acrylate, tridipentaerythritol hexa(meth)acrylate, tripentaerythritol hepta(meth)acrylate, tripentaerythritol octa(meth)acrylate, and tripentaerythritol poly(alkylene oxide) hepta(meth)acrylate. These di- or higher functional monomers may be used alone or in combination.

Another type of monomer is acrylate of epoxidized vegetable oil prepared through acrylic modification of epoxidized vegetable oil. This acrylate is a compound produced by ring-opening addition polymerization of (meth)acrylic acid to epoxy groups in the epoxidized vegetable oil prepared through epoxidization of double bonds in unsaturated vegetable oil with an oxidizing agent, for example, peracetic acid or perbenzoic acid. The unsaturated vegetable oil indicates triglyceride of at least one fatty acid having at least one carbon-carbon unsaturated bond. Examples of the vegetable oil include hemp seed oil, linseed oil, perilla oil, oiticica oil, olive oil, cocoa oil, kapok oil, kaya oil, mustard oil, apricot oil, tung oil, kukui oil, walnut oil, poppy oil, sesame oil, safflower oil, radish seed oil, soybean oil, hydnocarpus oil, camellia oil, corn oil, rapeseed oil, niger oil, rice-bran oil, palm oil, castor oil, sunflower oil, grape seed oil, almond oil, pine seed oil, cottonseed oil, coconut oil, peanut oil, and dehydrated castor oil. Since this type of monomer is derived from the vegetable oil, this serves to increase the amount of biomass ingredients in the ink composition. Several types of acrylates of epoxidized vegetable oil are commercially available and may thus be used.

The oligomer is a polymerized ingredient that has a high molecular weight, as described above. The oligomer inherently has a relatively high molecular weight, and thereby can be used for imparting appropriate viscosity and elasticity to the ink composition. Examples of the oligomers include epoxy-modified (meth)acrylates, such as esters formed by a reaction of (meth)acrylic acid with hydroxyl groups generated after opening of the epoxy rings contained in epoxy compounds, such as epoxy resins, using acids or bases; rosin-modified epoxidized acrylates; polyester-modified (meth)acrylates, such as esters formed by a reaction of (meth)acrylic acid with terminal hydroxyl groups of condensates of dibasic acids and diols; polyether-modified (meth)acrylates, such as esters formed by a reaction of (meth)acrylic acid with terminal hydroxyl groups of polyethers; and urethane-modified (meth)acrylates, such as esters formed by a reaction of (meth)acrylic acid with terminal hydroxyl groups of condensates of polyisocyanates and polyols. Such oligomers are commercially available under trade names, for example, Evecryl series available from Daicel Cytech Co., Ltd.; CN and SR series available from Sartomer Co., Ltd.; Aronix M-6000 series, 7000 series, 8000 series, Aronix M-1100, Aronix M-1200, and Aronix M-1600 available from Toagosei Co., Ltd.; and NK Oligo available from Shin-Nakamura Chemical Co., Ltd. These oligomers can be used alone or in combination.

The polymer having ethylenically unsaturated bonds is an ingredient that increases the molecular weight together with the monomers and oligomers, and has a high molecular weight even before irradiation with active energy rays, thereby enhancing the viscoelasticity of the ink composition. Such a polymer is used, for example, in a form of solution or dispersion in a monomer that is a low-viscosity liquid. Examples of the polymer having ethylenically unsaturated bonds include poly(diallyl phthalate), acrylic resins including unreacted and unsaturated groups, and acryl-modified phenol resins.

The content of the compound having one or more ethylenically unsaturated bonds in the ink composition is preferably 10 to 70 mass %, more preferably 20 to 60 mass %. Such a range of content of the compound having one or more ethylenically unsaturated bonds results in both high curability and superior printability. The content of the polymer having ethylenically unsaturated bonds is preferably 0 to 50 mass %, more preferably 0 to 30 mass %, and further more preferably 0 to 20 mass %. Such a range of content of the polymer preferably results in high curability of the ink composition as well as a reduction in misting through imparting appropriate viscoelasticity to the ink composition.

[Specific Liquid Ingredient]

The specific liquid ingredient is animal or vegetable-derived oil and fat or a modified product thereof that has no ethylenically unsaturated bonds and has a solubility parameter (sp value) (measured by turbidimetric titration) of 9.0 $(cal/cm^3)^{1/2}$ to less than 11.0 $(cal/cm^3)^{1/2}$. The oil and fat having such an sp value is useful, because not only the oil and fat gives a varnish having good compatibility with monomers and oligomers by dissolution of the conventional resins used in offset ink compositions, such as a rosin-modified phenol resin, but also the oil and fat is mostly inedible and the satisfactory biomass content can be achieved without causing the inanition issue. The present invention has focused on the fact that the specific liquid ingredient can concurrently solve these two problems (i.e., giving a varnish with good compatibility and achieving a biomass count without causing the inanition problem), and the use of such a specific liquid ingredient is one of key points of the present invention in addition to the use of the specific resin described later. Although the specific liquid ingredient is not polymerizable, the studies by the present inventors have revealed that not only the influence of this ingredient on the curability of the ink composition can be negligible, but also printing with the inventive ink composition containing the specific liquid ingredient gives print products with superior gloss based on the following reasons: Since the specific liquid ingredient has no ethylenically unsaturated bonds and does not rapidly polymerize in the presence of radicals, the ink composition containing the specific liquid ingredient can still maintain the flowability during the radical-induced polymerization of the ingredients such as monomers in the ink composition after printing, thereby contributing to an improvement in leveling.

Since the specific liquid ingredient has high compatibility with monomers and oligomers, the content of the specific liquid ingredient in the ink composition is not limited from the viewpoint of compatibility. A preferred content is 80 mass % or less from the viewpoint of characteristics of the ink composition, such as curability, in the present invention. The upper limit is more preferably 50 mass %, and further more preferably 30 mass %. The content of the specific liquid ingredient in the ink composition is preferably limited to 5 mass % or more. The lower limit is more preferably 10 mass %. The specific liquid ingredient preferably exhibits a liquid state at normal temperature. The "liquid state at normal temperature" indicates that the ink composition is in a liquid state at a temperature in a storage or a print environment. Examples of such normal temperature include about 0 to 50° C.

The sp value indicates "solubility parameter" value. The sp value can be measured by turbidimetric titration, which is a simple and practical measurement, and calculated in accordance with the following expression of K. W. Suh and J. M. Corbett (see J. Appl. Polym. Sci. 1968, 12,2359 on calculation of the sp value):

$$sp \text{ value} = (V_{ml}^{1/2} \cdot \delta H + V_{mh}^{1/2} \cdot \delta D)/(V_{ml}^{1/2} \pm V_{mh}^{1/2})$$

In the turbidimetric titration, 0.5 g of sample is dissolved in 10 mL of toluene or trimethylolpropane triacrylate (TMPTA), which is a good solvent, and then n-hexane, which is a poor solvent having a low sp value, is gradually added to the resultant solution while the volume of titration H (mL) is recorded at a turbid point. Similarly, ethanol, which is a poor solvent having a high sp value, is gradually added to the toluene solution while the volume of titration D (mL) is recorded at a turbid point. The values H and D are substituted into the following expressions to calculate $V_{ml}$, $V_{mh}$, δH, and δD, and these values can be substituted into the expression described above to calculate the sp value.

The molecular volume and sp value of each solvent used in the turbidimetric titration are as follows:

(Molecular volume of good solvent) φ0, toluene: 106.28 mL/mol, TMPTA: 279.55 mL/mol (Molecular volume of poor solvent having low sp value) φl, n-hexane: 131.61 mL/mol (Molecular volume of poor solvent having high sp value) φh, ethanol: 58.39 mL/mol (SP value of each solvent) toluene: 9.14, TMPTA: 9.88, n-hexane: 7.28, ethanol: 12.58

$$V_{ml} = (\varphi 0 \cdot \varphi 1)/\{(1-VH) \cdot \varphi 1 + VH \cdot \varphi 0\}$$

$$V_{mh} = (\varphi 0 \cdot \varphi h)/\{(1-VD) \cdot \varphi h + VD \cdot \varphi 0\}$$

$$VH = H/(M+H)$$

$$VD = D/(M+D)$$

$$\delta H = (\delta 0 \cdot M)/(M+H) + (\delta l \cdot H)/(M+H)$$

$$\delta D = (\delta 0 \cdot M)/(M+D) + (\delta l \cdot D)/(M+D)$$

δ0: sp value of good solvent
δl: sp value of poor solvent having low sp value
δh: sp value of poor solvent having high sp value
H: volume of titration of poor solvent having low sp value (mL)
D: volume of titration of poor solvent having high sp value (mL)
M: volume of good solvent (mL)
VH: volume fraction of titration of poor solvent having low sp value (%)
VD: volume fraction of titration of poor solvent having high sp value (%)

The term "animal or vegetable-derived oil and fat (or oil and fat that is derived from animals or vegetables)" usually means triglycerides such as animal and vegetable oils, but broadly means oily substances derived from animals and vegetables in the present invention. The modified products of animal or vegetable-derived oil and fat include those having sp values in the range described above after chemical modification of the animal or vegetable-derived oil and fat regardless of whether or not its sp value is in the above range. Examples of such modified products include triglyceride esters of fatty acids having high sp values, such as coconut oil and castor oil, hardened castor oil, polymerized castor oil, unsaturated animal or vegetable oils or epoxidized products of fatty acids thereof, polymers of cashew nut shell oil, and modified derivatives of cashew nut shell oil. The term "having no ethylenically unsaturated bonds" indicates that substituent groups, such as acryloyl groups, methacryloyl groups and vinyl groups, are not included, which can rapidly polymerize in the presence of radicals.

An unsaturated animal or vegetable oil or an epoxidized product of a fatty acid moiety thereof (hereinafter, appropriately abbreviated as "epoxidized oil and fat") is an ester of a fatty acid having at least one epoxy group and an alcohol. Such epoxidized oils and fats include not only triglycerides having epoxy groups but also esters of fatty acids having epoxy groups and alcohols (including monohydric alcohols or polyhydric alcohols). Examples of such alcohols include, but not limited to, alcohols having 1 to 14 carbon atoms, such as glycerol, methanol, ethanol, propanol, 2-propanol, and 2-ethylhexanol. In polyhydric alcohols such as glycerol, at least one fatty acid having at least one epoxy group may be condensed (i.e., an ester bond is formed), or multiple fatty acids each having at least one epoxy group may be condensed. In the case of multiple fatty acids, the fatty acids may be selected independently of each other. Since the epoxidized oil and fat exhibits a high sp value due to the presence of one or more epoxy groups in the molecule, various animal or vegetable oils or esters of fatty acids therefrom having an inherently low sp value may be used as raw materials and epoxidized to produce the epoxidized oil and fat.

The epoxy group is a three-membered cyclic ether (also referred to as "oxylane or alkylene oxide") where an oxygen atom is bonded to each of two carbon atoms already bonded to each other. Examples of epoxidized oil and fat include epoxidized soybean oil (ESO), epoxidized corn oil, epoxidized sunflower oil, epoxidized linseed oil, epoxidized canola oil, epoxidized rapeseed oil, epoxidized safflower oil, epoxidized tall oil, epoxidized tung oil, epoxidized fish oil, epoxidized beef tallow oil, epoxidized castor oil, epoxidized methyl stearate, epoxidized butyl stearate, epoxidized 2-ethylhexyl stearate, epoxidized stearyl stearate, 3,4-epoxicyclohexylmethyl-3,4-epoxycyclohexanecarboxylate epoxidized soybean oil, epoxidized propylene glycol dioleate, epoxidized palm oil, and epoxidized fatty acid methyl ester. Among all epoxidized oils and fats, preferred is epoxidized tall oil.

An epoxidized oil and fat can be prepared by various processes. For example, an epoxidized oil and fat having a triglyceride skeleton can be prepared through oxidation of vegetable oil or animal oil having unsaturated bonds in fatty acid moieties with an appropriate oxidizing agent or peroxide. In addition, an epoxidized oil and fat that is a fatty acid ester not having a triglyceride skeleton is prepared through the steps of: being subjected to esterification, ester exchange, or ester interchange reaction by reaction of an animal or vegetable oil-derived fatty acid having unsaturated bonds with an alcohol (either monool or polyol) to produce a fatty acid ester; and further oxidizing the fatty acid ester with an appropriate oxidizing agent or peroxide. Such a process for preparation is merely one example. Another process may be employed, or commercially available epoxidized oils and fats may be used.

Cashew nut shell oil, also referred to as "cashew nut shell liquid", is an oily liquid contained in cashew nut shells yielded as by-product during collection of natural cashew nut fruits used in food, and contains, for example, anacardic acid, cardol, 2-methyl cardol, and cardanol. Among these compounds, cardanol and cardol are compounds where hydroxyl groups and linear hydrocarbons are bonded to aromatic rings, 2-methylcardanol is a compound where a methyl group is bonded to an aromatic ring of cardanol, and cardanolic acid is a compound where a carboxyl group is bonded to an aromatic ring of cardanol, all of these compounds being regarded as alkenyl-substituted phenols. The alkenyl group contained therein is an aliphatic hydrocarbon group having 15 to 18 carbon atoms, and has 1 to 3 unsaturated bonds in the chain. The unsaturated bonds included in the alkenyl group are contained in the middle of the linear hydrocarbon group, and are different from the ethylenically unsaturated bonds. Various grades of cashew nut shell oils are commercially available, and such commercially available products may thus be used in the present invention. An extensive lineup of products exists depending on, for example, the purity, color, and odor of cardanol. Such a lineup includes Cardolite™ NX-2021, NX-2022, NX-2023D, NX-2023, UltraLITE 2023, NX-2024, NX-2025, and NX-2026 available from Cardolite Corporation, and CNSL, LB-7000, and LB-7250 available from Tohoku Chemical industries, Ltd.

Modified derivatives of cashew nut shell oil include those where various groups are introduced into the phenolic hydroxyl groups of alkenyl-substituted phenols contained in cashew nut shell oil, those where various substituents are introduced into unsaturated bonds of alkenyl groups, and those where the unsaturated bonds of alkenyl groups are oxidized and then epoxidized. Various modified derivatives are commercially available, and such commercially available products may thus be used in the present invention.

Among such modified derivatives, a compound represented by any of Chemical formulae (1) to (4) is preferred.

[Chemical formulae 1]

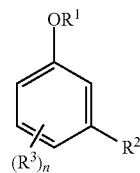
(1)

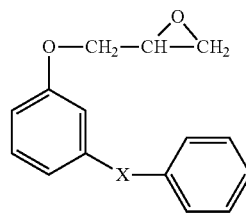
(2)

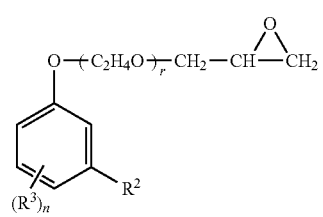
(3)

(4)

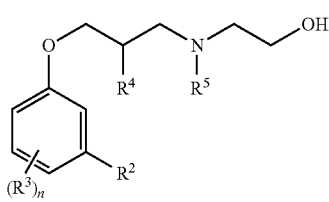

In Chemical formula (1), $R^1$ is a hydrogen atom, a glycidyl group, —$(CH_2)_mOH$ (m is an integer of 1 to 3), —$(C_2H_4O)_p$—H (p is an integer of 1 to 15), or —$(CH_2CH(CH_3)O)_q$—H (q is an integer of 1 to 15), $R^2$ is an aliphatic hydrocarbon group having 15 to 18 carbon atoms and having 0 to 3 unsaturated bonds, or a group where part or all of unsaturated bonds contained in the aliphatic hydrocarbon is oxidized to form an epoxy ring, and each $R^3$ is an independently $OR^1$, an alkyl group or a carboxyl group having 1 to 3 carbon atoms, n being an integer of 0 to 4.

Examples of commercially available products of the compound represented by Chemical formula (1) include Cardolite™ LITE2020, Cardolite™ NC-513, NC-510, GX-5166, GX-5167, GX-5170, GX-5248, GX-5190, GX-5191, and GX-2551 available from Cardolite Corporation. Among these products, LITE2020 is an alkenyl-substituted phenyl ether compound where $R^1$ is —$CH_2CH_2OH$, $R^2$ is an alkenyl group having 15 carbon atoms, and n is 0; NC-513 is an alkenyl-substituted phenylglycidyl ether where $R^1$ is glycidyl group, $R^2$ is an alkenyl group having 15 carbon atoms, and n is 0; NC-510 is an alkenyl-substituted phenol where $R^1$ is a hydrogen atom, $R^2$ is an alkenyl group having 15 carbon atoms, and n is 0; GX-5166, GX-5167, and GX-5170 are alkenyl-substituted phenylethyl oxylates where $R^1$ is —$(C_2H_4O)_p$—H (p is 7 in GX-5166, p is 9 in GX-5167, and p is 12 in GX-5170), $R^2$ is an alkenyl group having 15 carbon atoms, and n is 0; and GX-5243, GX-5190 and GX-5191 are alkenyl substituted phenylpropyl oxylates where $R^1$ is —$(CH_2CH(CH_3)O)_q$—H (q is 1 in GX-5243, q is 7 in GX-5190, and q is 9 in GX-5191), $R^2$ is an alkenyl group having 15 carbon atoms, and n is 0. GX-2551 is a mixture of compounds represented by Chemical formulae (5-1), (5-2), and (5-3), and is epoxidized cardanol where $R^1$ is a glycidyl group, $R^2$ is a group where one or more unsaturated bonds contained in an alkenyl group having 15 carbon atoms are oxidized to form an epoxidized ring, and n is 0.

[Chemical formulae 2]

(5-1)

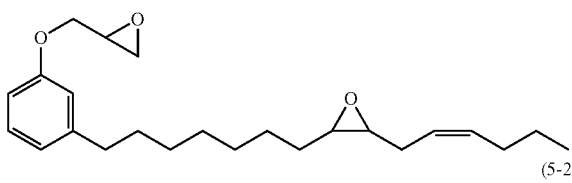

(5-2)

(5-3)

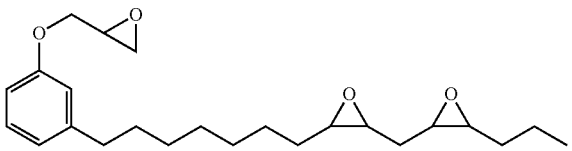

In Chemical formula (2), X is a linear or branched aliphatic hydrocarbon group having 15 to 18 carbon atoms and having 0 to 3 unsaturated bonds. Examples of commercially available products of the compound represented by Chemical formula (2) include Cardolite™ NC-514 available from Cardolite Corporation.

In Chemical formula (3), $R^2$, $R^3$ and n are the same as those in Chemical formula (1), and r is an integer of 1 to 5. Examples of commercially available products of the compound represented by Chemical formula (3) include Cardolite™ GX-2520 available from Cardolite Corporation.

In Chemical formula (4), $R^2$, $R^3$ and n are the same as those in Chemical formula (1), $R^4$ is a hydrogen atom or a hydroxyl group, and $R^5$ is a hydrogen atom or —$C_2H_4OH$. Examples of commercially available products of the compound represented by Chemical formula (4) include Cardolite™ GX-9301 and GX-9302 available from Cardolite Corporation.

Examples of the polymer of cashew nut shell oil preferably include a condensate of cashew nut shell oil and/or a modified derivative thereof with formaldehyde. One example of such a condensate is represented by Chemical formula (6).

[Chemical formula 3]

(6)

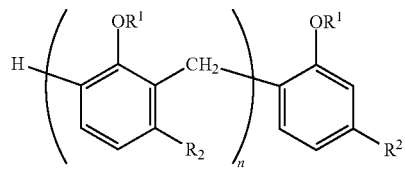

In Chemical formula (6), each $R^1$ is independently a hydrogen atom, —$(CH_2)_mOH$ (m is an integer of 1 to 3), or a glycidyl group, and each $R^2$ is independently an aliphatic hydrocarbon group having 15 to 18 carbon atoms and having 0 to 3 unsaturated bonds, and n is an integer of 1 or more.

Examples of commercially available products represented by Chemical formula (6) include Cardolite™ NC-547 and NX-4000 series available from Cardolite Corporation. NC-547 is a condensate of cardanol and a cardanol-modified derivative with formaldehyde and has a structure represented by Chemical formula (7-1). The NX-4000 series includes condensates of cardanol with formaldehyde and has a structure represented by Chemical formula (7-2).

[Chemical formulae 4]

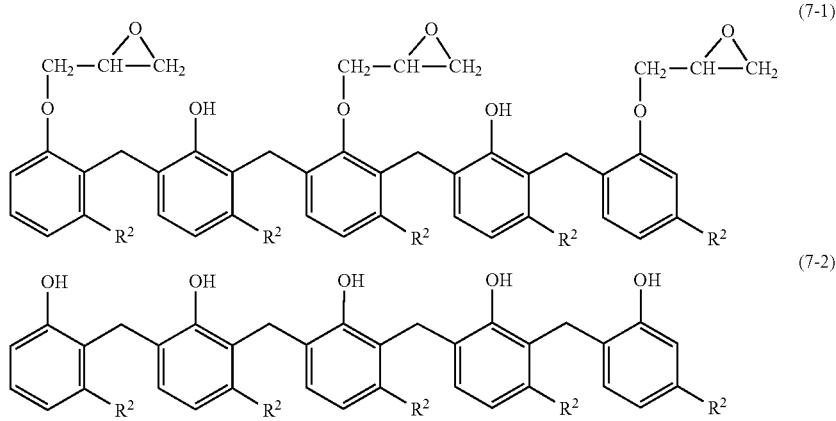

In Chemical formulae (7-1) and (7-2), each $R^2$ is independently an aliphatic hydrocarbon group having 15 to 18 carbon atoms and having 0 to 3 unsaturated bonds.

The specific liquid ingredient is preferably non-edible oil and fat or a modified product thereof. The non-edible oil and fat in the present specification refers to all oils and fats that are not suitable for food. If oils and fats having an sp value of less than 9.0 $(cal/cm^3)^{1/2}$ are chemically modified to yield modified products having an sp value of 9.0 $(cal/cm^3)^{1/2}$ or more, the modified products are categorized into a specific liquid ingredient defined in the present invention.

Among these specific liquid ingredients, at least one specific liquid ingredient is preferably selected from the group consisting of castor oil, coconut oil, epoxidized vegetable oil, cashew nut shell oil, and modified products of cashew nut shell oil.

As described above, the sp value of the specific liquid ingredient is 9.0 $(cal/cm^3)^{1/2}$ to less than 11.0 $(cal/cm^3)^{1/2}$. From the viewpoint of an achievement of higher compatibility of the specific resin described later with the specific liquid ingredient, the specific liquid ingredient is preferably at least one selected from the group consisting of animal or vegetable-derived fats and oils and modified products thereof, and cashew nut shell oil and modified products thereof, all having an sp value of 9.0 $(cal/cm^3)^{1/2}$ to 10.0 $(cal/cm^3)^{1/2}$. Since most of the specific resins described later have about 8.0 $(cal/cm^3)^{1/2}$ to 9.0 $(cal/cm^3)^{1/2}$, the upper limit of the sp value for the specific liquid ingredient is preferably about 9.0 $(cal/cm^3)^{1/2}$, as described above, except for cashew nut shell oil. The cashew nut shell oil has an sp value of 10.0 $(cal/cm^3)^{1/2}$ or more, but is exceptionally compatible with specific resins having a lower sp value and specific resins having a higher sp value. Although the reason is not necessarily clear, it is believed that cashew nut shell oil contains a phenolic compound having a long-chain alkyl group or alkenyl group, and thereby the long-chain alkyl group can enhance the compatibility with resins having a lower sp value and the phenol skeleton can enhance the compatibility with resins having a higher sp value.

[Specific Resin]

The specific resin includes at least one selected from the group consisting of rosin-modified phenol resins, rosin-modified maleic acid resins, rosin-modified alkyd resins, gilsonite resins, and asphalt resins. Although these resins have been widely used in conventional ink compositions such as offset ink compositions, they have poor compatibility with monomers and oligomers and have not been used in active energy ray-curable ink compositions. As described above, the present invention has been completed based on the finding that the combined use of the specific resin with the specific liquid ingredient can prepare a varnish that has high compatibility with monomers or oligomers. For example, the rosins in rosin-modified phenol resins and rosin-modified maleic acid resins are biomass-derived ingredients, and long-chain fatty acids in rosin-modified alkyd resins are also biomass-derived ingredients. The inventive ink composition accordingly has a higher biomass content.

Rosin-modified phenol resins, rosin-modified maleic acid resins, rosin-modified alkyd resins, gilsonite resins, and asphalt resins are all commercially available. These resins may be commercially available ones, or may be synthesized by known means. Among these resins, preferred are rosin-modified phenol resins.

The specific resin preferably has an sp value of 8.0 $(cal/cm^3)^{1/2}$ to 9.0 $(cal/cm^3)^{1/2}$ Such a range of sp value for the specific resin results in better compatibility with the specific liquid ingredient.

The content of the specific resin is preferably about 5 mass % to 30 mass % in the ink composition.

The specific resin is dissolved in the specific liquid ingredient at about 100 to 250° C. to form a varnish. The specific resin which is turned to the varnish in such a manner is mixed with ingredients such as monomers and oligomers to be used in the preparation of an ink composition.

[Photopolymerization Initiator]

The photopolymerization initiator is an ingredient that generates radicals by irradiation with ultraviolet rays, and the resultant radicals polymerize the compound having one or more ethylenically unsaturated bonds described above, thereby curing the varnish composition. The photopolymerization initiator may be any material that generates radicals by irradiation with active energy rays. As described above, the inventive varnish composition can also be cured with electron beams as active energy rays without addition of photopolymerization initiator to the inventive varnish composition.

Examples of the photopolymerization initiator include benzophenone, diethylthioxanthone, 2-methyl-1-(4-methylthio)phenyl-2-morpholinopropane-1-one, 4-benzoyl-4'-methyldiphenylsulfide, 1-chloro-4-propoxythioxanthone, isopropylthioxanthone, 2-hydroxy-2-methyl-1-phenylpropane-1-one, 1-hydroxycyclohexylphenyl ketone, bis-2,6-dimethoxybenzoyl-2,4,4-trimethylpentylphosphine oxide, 1-[4-(2-hydroxyethoxy)-phenyl]-2-hydroxy-2-methyl-1-propane-1-one, 2,2-dimethyl-2-hydroxyacetophenone, 2,2-dimethoxy-2-phenylacetophenone, 2,4,6-trimethylbenzyl-diphenylphosphine oxide, and 2-benzyl-2-dimethylamino-1-(morpholinophenyl)-butane-1-one. Such photopolymerization initiators are commercially available under trade names, for example, Irgacure 907, Irgacure 369, Irgacure 184, Irgacure 379, Irgacure 819, and TPO available from BASF SE; and DETX available from Lamberti S.p.A. These photopolymerization initiators can be used alone or in combination.

The content of the photopolymerization initiator is preferably 3 to 30 mass %, more preferably 2 to 15 mass %, and further more preferably 2 to 13 mass % in the ink composition. Such a range of content of the photopolymerization initiator in the ink composition preferably results in sufficient curing of the ink composition and compatibility between satisfactory internal curing and material costs.

[Coloring Ingredient]

Examples of coloring ingredients include yellow pigments such as Disazo Yellow (Pigment Yellow 12, 13, 14, 17, and 1) and Hansa Yellow, magenta pigments such as Brilliant Carmine 6B, Lake Red C and Watching Red, cyan pigments such as phthalocyanine blue, phthalocyanine green and alkali blue, black pigments such as carbon black, white pigments such as titanium oxide, and metal powders such as aluminum paste and bronze powder.

The ink composition may contain, for example, about 1 to 30 mass % coloring agent, which content is not essential. In the preparation of a color ink composition, another coloring agent as a complementary color or another color ink composition can be used in combination.

[Other Ingredients]

The inventive ink composition may further contain any other ingredient, as needed, in addition to the ingredients described above. Examples of such ingredients include extender pigments, polymerization inhibitors, dispersants, salts such as phosphates, waxes, such as polyethylene wax, olefin wax and Fischer-Tropsch wax, and alcohols.

The extender pigments impart appropriate properties, such as printability and viscoelasticity, to the ink composition, and various types of extender pigments generally used in the preparation of the ink composition can be used. Examples of such extender pigments include clay, kaolinite (kaolin), barium sulfate, magnesium sulfate, calcium carbonate, silicon oxide (silica), bentonite, talc, mica, and titanium oxide. The content of the extender pigment is, for example, about 0 to 33 mass % in the total ink composition, which content is not essential.

Examples of the polymerization inhibitors preferably include phenol compounds such as butylhydroxytoluene, tocopherol acetate, nitrosamine, benzotriazole, and hindered amine. More preferred is butylhydroxytoluene. The addition of such polymerization inhibitors to the ink composition can prevent an increase in viscosity of the ink composition caused by the progress of polymerization reaction during storage. The content of the polymerization inhibitors is, for example, about 0.01 to 1 mass % in the ink composition.

The dispersants are used to improve the state of dispersion of the coloring agents and extender pigments contained in the ink composition. Various types of dispersants are commercially available, for example, DISPERBYK™ series available from BYK Japan KK.

The inventive ink composition with the ingredients described above can be produced by a commonly known process. For example, such a process involves the following steps: mixing the ingredients; kneading the ingredients with, for example, a bead mill or a three-roll mill to disperse the pigments (i.e., the coloring agents and the extender pigments); optionally adding additives (e.g., polymerization inhibitors, alcohols, and waxes); and then adjusting the viscosity by addition of monomer ingredients and oil ingredients. The viscosity of the ink composition measured with a Laray viscometer at 25° C. is, for example, 10 to 70 Pa s, which value is not essential.

<Preparation of Active Energy Ray-Curable Ink Composition>

Another aspect of the present invention provides a method for preparing an active energy ray-curable ink composition. The method for producing the inventive active energy ray-curable ink composition containing a compound having one or more ethylenically unsaturated bonds, a specific resin, a specific liquid ingredient and a photopolymerization initiator comprises a step of dissolving the specific resin in the heated specific liquid ingredient to prepare a varnish, wherein the specific resin is at least one selected from the group consisting of rosin-modified phenol resins, rosin-modified maleic acid resins, rosin-modified alkyd resins, gilsonite resins, and asphalt resins, and the specific liquid ingredient is fat and oil derived from animals or vegetables or a modified product thereof having no ethylenically unsaturated bonds and a solubility parameter (sp value) of 9.0 $(cal/cm^3)^{1/2}$ to less than 11.0 $(cal/cm^3)^{1/2}$ as measured by turbidimetric titration. Such preparation will now be described focusing on new information without redundant description of details that have been already described in the precedent paragraphs.

The inventive process is characterized by a step of dissolving a specific resin in a heated specific liquid ingredient to prepare a varnish. The specific liquid ingredient and the specific resin are as described above.

The step of dissolving the specific resin in the heated specific liquid ingredient to prepare the varnish involves adding the specific resin to the specific liquid ingredient, and then stirring the mixture with heating to about 100 to 250° C. Although a typical dissolution time ranges from about 30 to 60 minutes, the dissolution time may be appropriately adjusted depending on the state of dissolution.

In the preparation of the varnish, the mixing ratio by mass of the specific resin to the specific liquid ingredient may be, but not limited to, about 20:80 to 40:60 (specific resin: specific liquid ingredient).

The resultant varnish is mixed and kneaded with various ingredients described above to prepare an ink composition. The content of the varnish is preferably about 20 to 70 mass %, more preferably about 20 to 60 mass %, and further more preferably about 20 to 50 mass % in the ink composition.

<Production of Printed Matter>

Another aspect of the present invention provides a method for producing printed matter, the method being characterized in that the inventive active energy ray-curable ink composition is used in printing. The inventive method for producing printed matter is carried out by an ordinary printing technique except for the use of the inventive ink composition. Such a printing technique preferably includes a resin relief printing. Examples of print targets in the use of the resin relief printing are as already described.

Irradiation of a wet ink composition applied to the surface of printed matter with active energy rays can instantly turn into a dried state. This dried state can be achieved by curing the ink composition present on the surface of printed paper through the irradiation with the active energy rays. Known active energy rays, such as electron beams or ultraviolet rays, can be employed.

EXAMPLES

The present invention will be described in further detail by way of the following examples, although the present invention should not be limited to these examples. In the following description, "%" indicates "mass %" and "parts" indicates "parts by mass" unless otherwise specified. The unit of the sp value is $(cal/cm^3)^{1/2}$

[Preparation of Varnish 1]

Rosin-modified phenol resin (40 parts by mass, sp value: 8.83) was dissolved in epoxidized soybean oil (60 parts by mass) at 200° C. for 60 minutes to prepare Varnish 1.

[Preparation of Varnish 2]

Varnish 2 was prepared as in Varnish 1 except that castor oil was used in place of epoxidized soybean oil.

[Preparation of Varnish 3]

Varnish 3 was prepared as in Varnish 1 except that trimethylolpropane triacrylate (TMPTA) was used in place of the epoxidized soybean oil. However, the resin was not dissolved in Varnish 3.

[Preparation of Varnish 4]

Varnish 4 was prepared as in Varnish 1 except that soybean oil was used in place of epoxidized soybean oil.

[Preparation of Varnish 5]

Polydiallyl phthalate (40 parts by mass, A-DAP, available from Osaka Soda Co., Ltd.) was dissolved in TMPTA (60 parts by mass) at 100° C. for 60 minutes to prepare Varnish 5. Varnish 5 is equivalent to varnish used in a conventional active energy ray-curable ink composition that contains no specific resin.

[Preparation of Ink Composition]

Carbon black (MA-70, available from Mitsubishi Chemical Corporation), Varnishes described above, trimethylolpropane triacrylate (TMPTA), ditrimethylolpropane tetraacrylate (DI-TMPTA), Irgacures 907 and 184 (trade name, available from BASF SE, photopolymerization initiators), and polyethylene wax are mixed according to formulations shown in Table 1 and then kneaded with a three-roll mill to prepare ink compositions of Examples 1 and 2, Comparative example 1, and Reference example 1. Since the resin was not dissolved in Varnish 3 where the inventive specific liquid ingredient was not used as described above, Varnish 3 was not employed in the preparation of the ink composition.

[Evaluation of Gloss]

For each ink composition of Examples, Comparative example, and Reference example, 0.1 cc of ink composition was spread onto coated paper (Aurora Coat, available from Nippon Paper Industries co., Ltd.) with an RI testerd (Two-split roll, available from Akira Co., Ltd.) and then cured by irradiation with ultraviolet rays in an irradiation dose of 40 mJ/cm². The density of ink composition was adjusted such that the density immediately after curing exhibited 1.50, the density being measured with a Spectroeye densitometer (available from GretagMacbeth GmbH). The 60° reflected gloss of each spread surface was determined with a Murakami digital gloss meter (available from Murakami Color Research Laboratory). The results are shown in the column "Gloss" of Table 1. It is noted that the ink composition causing some precipitates due to poor compatibility was not evaluated and shown as "unevaluable" in each column.

[Evaluation of Curability]

For each ink composition of Examples, Comparative example, and Reference example, curability was evaluated. 0.1 cc of ink composition was spread onto coated paper (Aurora Coat, available from Nippon Paper Industries co., Ltd.) with an RI tester (Two-split roll, available from Akira Co., Ltd.) and then immediately cured by irradiation with ultraviolet rays (metal halide lamp, an irradiation dose of 36 mJ/cm²) to form a cured film of the spread ink composition. After the resultant cured film was left at room temperature for one minute, the surface of the film (i.e., the printed surface) was rubbed with a Gakushin type Color fastness rubbing tester (load: 1 kg, cover paper: woodfree paper) ten times. The state on the printed surface after rubbing was visually observed and was ranked into the following four-stage criterion. The results are shown in the column "Curability" of Table 1.

● : no scratches on the printed surface, indicating very good film
○ : Slight scratches on the printed surface, indicating no practical problem
Δ : Conspicuous scratches on the printed surface
X : Separation of the film on the printed surface

TABLE 1

|  | Example 1 | Example 2 | Comparative Example 1 | Reference Example 1 |
|---|---|---|---|---|
| Varnish 1 | 41 | | | |
| Varnish 2 | | 41 | | |
| Varnish 4 | | | 41 | |
| Varnish 5 | | | | 41 |
| Carbon black | 20 | 20 | 20 | 20 |
| TMPTA | 6 | 6 | 6 | 6 |
| DI-TMPTA | 21 | 21 | 21 | 21 |
| Irgacure 907 | 8 | 8 | 8 | 8 |
| Irgacure 184 | 3 | 3 | 3 | 3 |
| Polyethylene wax | 1 | 1 | 1 | 1 |
| Total | 100 | 100 | 100 | 100 |
| Slope | 8.9 | 9.2 | unevaluable | 9.0 |
| Gloss | 40 | 42 | unevaluable | 35 |
| Curability | ● | ● | unevaluable | ● |

Table 1 illustrates that the inventive ink composition exhibited compatibility similar to and had better gloss than a conventional active energy ray-curable ink composition (Reference example 1) although rosin-modified phenol resin was used. These results evidentially demonstrate that the specific resin, which has been difficult to be employed in the active energy ray-curable ink composition, can be used in combination with a specific liquid ingredient.

The invention claimed is:

1. An active energy ray-curable ink composition comprising:
    a compound having one or more ethylenically unsaturated bonds;
    a specific resin; and
    a specific liquid ingredient, wherein
    the specific resin is at least one selected from the group consisting of rosin-modified phenol resins, rosin-modified maleic acid resins, rosin-modified alkyd resins, gilsonite resins, and asphalt resins,
    the specific liquid ingredient is at least one selected from the group consisting of cashew nut shell oil and a modified product of cashew nut shell oil having no ethylenically unsaturated bonds and a solubility parameter (sp) value of 9.0 $(cal/cm^3)^{1/2}$ to less than 11.0 $(cal/cm^3)^{1/2}$ as measured by turbidimetric titration, and the specific resin has an sp value of 8.0 $(cal/cm^3)^{1/2}$ to 9.0 $(cal/cm^3)^{1/2}$.

2. The active energy ray-curable ink composition according to claim 1, wherein the content of the specific liquid ingredient is 10 mass % to 50 mass % in the ink composition.

3. The active energy ray-curable ink composition according to claim 1, wherein the specific resin is a rosin-modified phenol resin.

4. A method for producing an active energy ray-curable ink composition containing a compound having one or more ethylenically unsaturated bonds, a specific resin, a specific liquid ingredient, and a photopolymerization initiator, the method comprising:

a step of dissolving the specific resin in the heated specific liquid ingredient to prepare a varnish, wherein the specific resin is at least one selected from the group consisting of rosin-modified phenol resins, rosin-modified maleic acid resins, rosin-modified alkyd resins, gilsonite resins, and asphalt resins, and the specific liquid ingredient is at least one selected from the group consisting of cashew nut shell oil and a modified product of cashew nut shell oil having no ethylenically unsaturated bonds and a solubility parameter (sp) value of 9.0 $(cal/cm^3)^{1/2}$ to less than 11.0 $(cal/cm^3)^{1/2}$ as measured by turbidimetric titration.

5. A method for producing printed matter, comprising a step of printing with the active energy ray-curable ink composition according to claim 1.

* * * * *